Patented Dec. 13, 1949

2,490,924

UNITED STATES PATENT OFFICE 2,490,924

STABILIZED ROSIN AMINE PEST CONTROL COMPOSITION

Glenwood L. Schertz, Wilmington, Del., assignor to Hercules Powder Company, Wilmington, Del., a corporation of Delaware No Drawing. Application July 18, 1947, Serial No. 762,016

9 Claims. (Cl. 167—30)

This invention relates to pest control compositions and, more particularly, to pest control compositions containing a rosin amine as the active ingredient, which compositions are valuable for controlling harmful organisms which attack plant and animal matter, such as bacteria, fungi, etc.

Now, in accordance with this invention, it has been found that an amine of a stabilized rosin, or the coordinate covalent salts thereof, is toxic to both plant and animal organisms and other harmful lower forms of life. Thus, compositions containing these amines, or salts thereof, are very effective in controlling pests which are economically or physiologically harmful.

The pest control compositions in accordance with this invention are particularly effective as fungicides. Cotton fabric, wood, rope, leather, etc., rapidly deteriorate by rotting when exposed to conditions favorable to mycological growth. For example, wooden equipment which is buried or partially buried in the ground, as in the case of railroad ties and telephone poles, is subject to severe weathering conditions and quickly rots due to the growth of destructive fungi. Likewise, cotton fabric, rope, and leather are subject to rotting from mycological growth, in particular, mildew. The deterioration of tenting equipment, shoes, etc., in tropical climates has long been a difficult and costly problem. These materials which are commonly subject to deterioration due to attack by injurious fungi are protected from such deterioration by treating them with the pest control compositions of this invention. The following examples illustrate the high fungicidal efficiency of these pest control compositions.

Example 1

Samples of cotton duck were impregnated with dehydrogenated rosin amine and derivatives thereof by immersing them in 10% solutions of the rosin amine compound in suitable solvents. After evaporation of the solvent from each sample, they were buried, together with samples of untreated cotton duck as controls, in mushroom soil for a period of 12 weeks. They were then dug up and the tensile strength of each sample determined. The control samples, untreated cotton duck, were found to be completely disintegrated. The following table gives the tensile strength of the samples; each result given represents an average of several experiments with each impregnant.

| Impregnant | | Grab Strength, lb. |
|---|---|---|
| Rosin Amine Compound | Solvent | |
| Dehydrogenated rosin amine | Gasoline | 129 |
| Dehydrogenated rosin amine acetate | Water | 127 |
| Dehydrogenated rosin amine stearate | Acetone | 55 |
| Dehydroabietyl amine complex of cupric acetate | Gasoline | 121 |
| Dehydroabietyl amine complex of zinc chloride | Benzene | 126 |
| Untreated | | (¹) |
| Untreated and unexposed | | 118 |

¹ Completely disintegrated.

Example 2

Example 1 was repeated except that samples of rope were used in place of the cotton duck. After burial, the samples were tested for their tensile strength. The results given in the following table represent an average of several experiments with each impregnant.

| Impregnant | | Load at Breaking Point, lb. |
|---|---|---|
| Rosin Amine Compound | Solvent | |
| Dehydrogenated rosin amine | Gasoline | 317 |
| Dehydrogenated rosin amine acetate | Water | 372 |
| Dehydrogenated rosin amine stearate | Acetone | 284 |
| Dehydroabietyl amine complex of cupric acetate | Gasoline | 340 |
| Dehydroabietyl amine complex of zinc chloride | Benzene | 375 |
| Untreated | | (¹) |
| Untreated and unexposed | | 364 |

¹ Broke on slight manual stretching.

Example 3

Samples of cotton duck were impregnated with dehydrogenated rosin amine and hydrogenated rosin amine by immersing them in gasoline solutions of the two compounds, the samples containing 0.5% of the amine after drying. The resistance of the treated duck to mildew was judged by determination of the change in the breaking strength after seven days' burial in soil. The breaking strengths of the samples are shown in the following table:

| Impregnant | Breaking Strength | | |
|---|---|---|---|
| | Before Burial, lb. | After Burial | |
| | | lb. | Percent Change |
| Dehydrogenated Rosin Amine | 206 | 200 | −3 |
| Hydrogenated Rosin Amine | 206 | 208 | +1 |
| Untreated | 200 | 33 | −82 |

Example 4

Samples of cotton duck were impregnated with a solution of the hydroabietylamine complex of copper acetate in mineral spirits, the solution containing 0.5% copper. One-half of the samples was leached with water for one week by allowing a stream of tap water to flow over them. The samples were analyzed and found to contain 0.37% copper before leaching and 0.28% copper after the leaching process. The unleached and leached samples were then buried in soil, and the change in the warp-breaking strength was determined. There was no loss in breaking strength of the unleached samples even after six weeks' burial, whereas untreated samples of the duck had a loss of 100% after two weeks' burial. The leached samples had no loss in breaking strength after three weeks' burial but had a loss of 20% after six weeks' burial.

Example 5

Emulsions of a number of rosin amine compounds containing one part of the rosin amine compound in 800 parts of water, kerylbenzene sulfonate being used as the emulsifying agent, were tested for their control of the fungi Alternaria. Observations were made both prior and subsequent to 1½ inches of rain. The following table shows the control obtained with each of the compounds:

| | Spore Count (per cent of control) | |
|---|---|---|
| | No Rain | Rain |
| Control | 100 | 100 |
| Dehydrogenated Rosin Amine | 3 | 99 |
| Dehydroabietylamine Bicarbonate | 1 | 94 |
| Dehydroabietylamine Hydrochloride | 0 | 80 |
| Dehydroabietylamine Monophosphate | 18 | 100 |
| Dehydroabietylamine Salicylate | 3 | 100 |
| Dehydroabietylamine Borate | 6 | 99 |
| Dehydroabietylamine Thiocyanate | 0 | 96 |
| Dehydroabietylamine Chloroacetate | 0 | 100 |
| Dehydroabietylamine Chloropropionate | 13 | 100 |
| Dehydroabietylamine Benzoate | 25 | 100 |
| Dehydroabietylamine Complex of Zinc Chloride | 33 | 100 |

Example 6

Emulsions of rosin amine compounds were tested for their control of the fungi, Macrosporium, in the same way as described in Example 5, with the following results:

| | Spore Count (per cent of control) | |
|---|---|---|
| | No Rain | Rain |
| Control | 100 | 100 |
| Dehydrogenated Rosin Amine | 1 | 54 |
| Dehydroabietylamine Bicarbonate | 1 | 43 |
| Dehydroabietylamine Hydrochloride | 0 | 17 |
| Dehydroabietylamine Monophosphate | 15 | 36 |
| Dehydroabietylamine Oleate | 86 | 35 |
| Dimethyldehydroabietylamine | 51 | 63 |
| N-Dehydroabietyl Hydroxymethyl Amine | 48 | 27 |
| N-Dehydroabietyl Diethanolamine | 12 | 22 |
| Trimethyldehydroabietyl Ammonium Iodide | 0 | 12 |
| Dehydroabietyl Ammonium Salicylate | 2 | 21 |
| Dehydroabietylamine Complex of Copper Acetate | 4 | 96 |
| Dehydroabietylamine Complex of Zinc Chloride | 0 | 22 |
| Dehydroabietylamine Borate | 9 | 75 |
| Dehydroabietylamine Thiocyanate | 0 | 6 |
| Dehydroabietylamine Chloroacetate | 0 | 1 |
| Dehydroabietylamine Chloropropionate | 0 | 29 |
| Dehydroabietylamine Oxalate | 28 | 100 |
| Dehydroabietylamine Formate | 38 | 88 |
| Dehydroabietylamine Sulfide | 15 | 100 |
| Dehydroabietylamine Arsenate | 55 | 75 |
| Dehydroabietylamine Benzoate | 0 | 29 |

The stabilized rosin amines or salts thereof also have a high degree of germicidal activity, and compositions containing these compounds are powerful disinfectants. These disinfectant compositions are particularly useful in disinfecting or sterilizing lavatory installations, eating utensils, dairy equipment, surgical instruments and other hospital equipment, or other articles requiring such treatment. The following examples illustrate the germicidal efficacy of the compositions in accordance with this invention, as demonstrated by their phenol coefficients. In each case, the phenol coefficient was determined by the F. D. A. method at 20° C.

Example 7

The phenol coefficients were determined on 10% aqueous solutions of a number of the water-soluble salts of the stabilized rosin amines and are given in the following table:

| Rosin Amine Salt | Phenol Coefficient | |
|---|---|---|
| | E. Typhi | Staph. Aureus |
| Dehydrogenated rosin amine acetate | 13.0 | 18.0 |
| Dimethyl benzyl dehydrogenated rosin ammonium chloride | 4.0 | 25.0 |
| Dimethyl allyl dehydrogenated rosin ammonium bromide | 6.0 | 6.5 |
| Dimethyl methoxy methyl dehydrogenated rosin ammonium chloride | 9.1 | 2.4 |
| Trimethyl dehydrogenated rosin ammonium methyl sulfate | 5.2 | 4.6 |

Instead of solutions of water-soluble salts of the rosin amines, the amine itself may be used as an effective germicide in the form of an emulsion. Any suitable emulsifying agent, such as fatty acid soaps or neutral emulsifiers, may be used to form the germicidal emulsion. The following example illustrates the germicidal properties of such an emulsion.

Example 8

The phenol coefficient of a composition containing a stabilized rosin amine and an emulsifying agent was determined and compared with that of the emulsifying agent alone, with the following results. The emulsifying agent used was a polyoxyalkylene derivative of a sorbitol monoester of a long-chain fatty acid.

| Composition | Phenol Coefficient | |
| --- | --- | --- |
| | E. Typhi | Staph. Aureus |
| 84% Dehydrogenated rosin amine and 16% emulsifying agent | 40.8 | 138 |
| Emulsifying agent alone | <0.06 | <0.06 |

The stabilized rosin amines or salts thereof may also be used in combination with other disinfectants, such as pine oil, etc. The following example demonstrates the increase in the germicidal properties of a pine oil emulsion when a stabilized rosin amine or salt thereof is added.

*Example 9*

The effect of adding a rosin amine or rosin amine salt to a combination of pine oil and emulsifying agent is shown in the following table. The emuslifying agent used was the same as that in Example 8 above.

| Composition | Phenol Coefficient | |
| --- | --- | --- |
| | E. Typhi | Staph. Aureus |
| 76% pine oil and 24% emulsifying agent | 6.0 | |
| 76% pine oil, 8% dehydrogenated rosin amine, 16% emulsifying agent | 12.2 | 12.1 |
| 76% pine oil, 8% dehydrogenated rosin amine acetate, 16% emulsifying agent | 8.6 | 12.1 |

The stabilized rosin amines or salts thereof also exhibit insecticidal properties, compositions containing them as the active toxic ingredient having a killing powder against houseflies greater that that of the Official Test insecticide. For example, a 10% solution of hydrogenated rosin amine in deodorized kerosene had a kill of 49% when tested against houseflies, whereas the Official Test insecticide had a kill of only 32%. However, the use of these compositions for controlling insects is limited because their phytotoxic properties prevent their general use as plant sprays.

On the other hand, these compositions, being toxic to some plants, are valuable weed killers or deterrents, particularly against crab grass, without adversely affecting the desirable grasses. Crab grass is one of the worst lawn pests and is eradicated only with great difficulty. However, the application of even an 0.15% aqueous solution of dehydrogenated rosin amine acetate on the lawn caused the crab grass to yellow and wither, and periodic treatments during the crab grass season eradicated the pest.

Thus, the compositions of this invention, containing a stabilized rosin amine or salt thereof, are effective for controlling a wide variety of pests, such as micro-organisms and other plant and animal organisms. They may be used to treat cotton, rope, wood, hemp, leather, etc., to reduce deterioration due to fungal growth. They may also be used as insecticides, in certain applications, and as weed killers, germicides, and disinfectants.

Any stabilized rosin amine or coordinate covalent salt thereof may be used as the active ingredient of the pest control compositions in accordance with this invention. The rosin amines which may be used are the amines of stabilized rosins, such as those of dehydrogenated or disproportionated rosin, polymerized rosin, or hydrogenated rosin. If desired, the amines of the pure resin acids, such as dehydroabietylamine, hydroabietylamine, etc., may be used. By the term "stabilized rosin amine" is meant a rosin amine having the ring structure of a stabilized rosin acid, such as dehydroabietic acid, dihydroabietic acid, tetrahydroabietic acid, polyabietic acid, or a mixture of such rosin amines.

The stabilized rosin amines used as pest control agents in accordance with this invention may be prepared by reacting ammonia with a stabilized rosin to form the nitrile and then hydrogenating the nitrile to form the amine. The preparation of the nitrile may be carried out by passing gaseous ammonia into the molten rosin material and vaporizing the water as fast as it is formed in order to remove the water from the reaction mixture. The nitrile may also be prepared by heating the rosin material with ammonia in the presence of a dehydration catalyst. In either case, the nitrile should be purified by neutralization or distillation before subjecting it to hydrogenation to prepare the amine, as the presence of acidic materials frequently destroys the hydrogenation catalyst.

The resin acid nitriles prepared from the stabilized rosins are then hydrogenated to prepare the amine. The hydrogenation may be carried out in the presence or absence of ammonia. Likewise, a solvent may be used in the reaction but is not necessary. Any active hydrogenation catalyst may be used, as, for example, an active base metal catalyst such as nickel, cobalt, Raney nickel, Raney cobalt, etc., a noble metal catalyst such as active platinum, palladium, palladium on carbon, or reduced platinum oxide. The reaction is usually carried out at a pressure of from about 200 to 8000 pounds per square inch and at a temperature of from about 20° C. to about 200° C.

In addition to the above-mentioned primary rosin amines, secondary and tertiary rosin amines are effective pest control agents, particularly the lower alkyl and alkylol rosin amines, as, for example, methyldehydroabietylamine, ethyldehydroabietylamine, dimethyldehydroabietylamine, diethyldehydroabietylamine, isopropyl dehydroabietylamine, butyl dehydroabietylamine, N-dehydroabietyl methylol amine, N-dehydroabietyl ethanol amine, N-dehydroabietyl diethanol amine, N-dehydroabietyl 3-hydroxybutylamine, and the corresponding secondary and tertiary hydroabietylamines. These secondary and tertiary rosin amines may be prepared by reacting the rosin amine with an alkyl halide or sulfate or by a simultaneous condensation and reduction of the rosin amine and an aldehyde or ketone. The secondary and tertiary alkanol amines may be prepared by reacting the rosin amine with a suitable epoxide, such as ethylene oxide, etc.

The primary, secondary, or tertiary rosin amines may also be used in the form of their salts. The salts are readily prepared by adding an acid of the desired anion to the rosin amine either in the presence or absence of a solvent for the reaction. In some cases the salts, as, for example, the thiocyanate, sulfide, arsenate, etc., are more easily prepared by a metathesis reaction between a rosin amine salt, such as the acetate, and a suitable alkali metal salt. The salts of secondary and tertiary rosin amines may also be prepared by addition of an alkyl halide, sulfate, etc., to the primary rosin amine. As examples of the salts of rosin amines which may be used in accordance with this invention, may be mentioned the hydrochloride, hydrobromide, carbonate, phosphate, sulfate, borate, thiocyanate, oxalate, sulfide, arsenate, formate, acetate, chloroacetate, bromoacetate, propionate, chloropropionate, butyrate, oleate, laurate, stearate, malonate, adipate, benzoate, salicylate, phthalate, sulfamate, maleate, etc.

Quaternary ammonium salts of the rosin amines may also be used as the active ingredient of the pest control compositions of this invention, as, for example, the trialkyl, trialkanol, dialkyl, aralkyl, etc., rosin ammonium salts. Typical of these quaternary salts, which may be used are trimethyl dehydroabietyl ammonium iodide, trimethyl dehydroabietyl ammonium methyl sulfate, dimethyl benzyl dehydroabietyl ammonium chloride, dimethyl allyl dehydroabietyl ammonium bromide, dimethyl methoxy methyl dehydroabietyl ammonium chloride, dimethyl ethanol dehydroabietyl ammonium bromide, etc., and the corresponding hydroabietyl compounds. These quaternary salts may be prepared by the addition of an alkyl, alkenyl, or aralkyl halide, or dialkyl sulfate, to a tertiary rosin amine or by the reaction of a halohydrin such as ethylenebromohydrin with a tertiary rosin amine.

Another class of rosin amine derivatives which may be used in the compositions of this invention is the complex metal ammine salts of the rosin amines. These metal complexes are formed by reacting an amine of a stabilized rosin with a metal salt capable of forming complexes with ammonia, such as the copper, zinc, chromium, mercury, silver, aluminum, iron, cobalt, nickel, etc., salts. Complex metal ammine salts produced in this manner are the subject of my copending application, Serial Number 722,285. Typical compounds that may be used are dehydroabietyl ammino cupric acetate, dehydroabietyl ammino zinc chloride, dehydroabietyl ammino zinc acetate, dehydroabietyl ammino silver nitrate, dehydroabietyl ammino aluminum chloride, dehydroabietyl ammino mercuric acetate, etc., and the corresponding hydroabietyl ammino compounds. The rosin amine complexes of zinc, copper, silver, and mercury salts are particularly effective fungicides.

The pest control compositions in accordance with this invention comprises a stabilized rosin amine or coordinate covalent salts thereof and a diluent, the latter being determined by the use of the composition, as is the concentration of the active ingredient in the diluent. Thus, when used as a fungicide, as, for example, in treating wood, a solution of the agent in any suitable solvent, such as gasoline, benzene, kerosene, or aqueous emulsions, may be painted or sprayed on the wood. In this use a solution containing about 10% of the fungicide gives excellent protection. In rotproofing cloth, rope, etc., the fungicide may be applied by impregnation with a solution of the agent in a suitable solvent or it may be applied in formulations containing other materials, such as flameproofers, resins, plasticizers, and pigments. For use in protecting plants, the fungicide may be applied as an aqueous eumlsion made by emulsifying the active agent in water with any suitable emulsifying agent or it may be applied as a dust, the active agent being mixed with an inert diluent or carrier, such as kieselguhr, bentonite, pyrophyllite, etc.

When used as a disinfectant, the diluent may be water, alcohol, pine oil, etc., or the amine compound may be used in the form of an emulsion. Particularly useful as germicides or disinfectants are the stabilized rosin amines, the salts thereof, and the quaternary ammonium salts thereof. The water-soluble salts are usually preferable but, in some instances, water-insoluble salts are desirable. The concentration of the active ingredient in the disinfectant composition will depend upon the use; the concentration should be such that sterilization is obtained in a practical length of time. The disinfectant compositions in accordance with this invention may be used to sanitize, disinfect, or sterilize a variety of implements or other articles whose use makes the control of microbial growth essential. The article to be treated may be immersed or otherwise exposed to the disinfectant and, after a time sufficient to insure complete destruction of the micro-organisms, the article may be rinsed with a pure solvent to remove the reactive agent. These disinfectants are particularly valuable in washing floors, walls, and installations in hospitals, etc., where complete sterilization is essential.

By the term "coordinate covalent salts of an amine of a stabilized rosin," as used in the specification and claims, is meant the ammonium salts of the primary, secondary, and tertiary amines formed by the addition of an acid to the amine of a stabilized rosin; the quaternary ammonium salts of the amines; i. e., the salt formed by the addition of an alkyl or aralkyl halide, etc., to a tertiary amine of a stabilized rosin; and the complex metal ammine salts; i. e., the complex formed between the rosin amine and a metal salt capable of forming a complex.

What I claim and desire to protect by Letters Patent is:

1. A pest control composition in the form of a dust comprising a compound of the group consisting of a stabilized rosin amine and the coordinate covalent salts thereof admixed with a substantial amount of a material of the group consisting of pyrophyllite, bentonite, and kieselguhr.

2. A pest control composition in the form of a dust comprising a stabilized rosin amine admixed with a material of the group consisting of pyrophyllite, bentonite, and kieselguhr.

3. A pest control composition in the form of a dust comprising dehydrogenated rosin amine admixed with a material of the group consisting of pyrophyllite, bentonite, and kieselguhr.

4. A pest control composition in the form of a dust comprising a coordinate covalent salt of a stabilized rosin amine admixed with a material of the group consisting of pyrophyllite, bentonite, and kieselguhr.

5. A pest control composition in the form of a dust comprising a coordinate covalent salt of dehydroabietylamine admixed with a material of the group consisting of pyrophyllite, bentonite, and kieselguhr.

6. A pest control composition in the form of a dust comprising a coordinate covalent zinc salt of dehydroabietyl rosin amine admixed with a material of the group consisting of pyrophyllite, bentonite, and kieselguhr.

7. A pest control composition in the form of a dust comprising the dehydroabietylamine complex of zinc chloride admixed with a material of the group consisting of pyrophyllite, bentonite, and kieselguhr.

8. A pest control composition in the form of a dust comprising a coordinate covalent complex copper salt of dehydroabietylamine admixed with a material of the group consisting of pyrophyllite, bentonite, and kieselguhr.

9. A pest control composition in the form of a dust comprising the dehydroabietylamine complex of cupric acetate admixed with a material of the group consisting of pyrophyllite, bentonite, and kieselguhr.

GLENWOOD L. SCHERTZ.

REFERENCES CITED

The following references are of record in the file of this patent:

UNITED STATES PATENTS

| Number | Name | Date |
|---|---|---|
| 2,137,295 | Koeberle | Nov. 22, 1938 |
| 2,165,515 | Schmidt | July 11, 1939 |
| 2,240,936 | Littmann | May 6, 1941 |
| 2,367,001 | Campbell | Jan. 9, 1945 |
| 2,412,557 | Blair | Dec. 17, 1946 |
| 2,423,619 | Roon | July 8, 1947 |